US012655935B2

(12) United States Patent
Gignac

(10) Patent No.: US 12,655,935 B2
(45) Date of Patent: Jun. 16, 2026

(54) OIL TANK ACCESS PORT COVER FOR AN AIRCRAFT ENGINE OIL SYSTEM

(71) Applicant: Pratt & Whitney Canada Corp., Longueuil (CA)

(72) Inventor: Stephane Gignac, Boucherville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/896,487

(22) Filed: Sep. 25, 2024

(65) Prior Publication Data

US 2026/0085785 A1      Mar. 26, 2026

(51) Int. Cl.
F16N 21/06 (2006.01)
F02C 7/06 (2006.01)

(52) U.S. Cl.
CPC .............. F16N 21/06 (2013.01); F02C 7/06 (2013.01); *F05D 2260/98* (2013.01); *F16N 2210/08* (2013.01)

(58) Field of Classification Search
CPC ...... F16N 21/06; F16N 2210/08; F16N 23/00; F16N 29/02; F02C 7/06; F05D 2260/98
USPC ........................................................ 184/6.27
See application file for complete search history.

(56) References Cited

U.S. PATENT DOCUMENTS

| | | | |
|---|---|---|---|
| 3,006,499 A | 10/1961 | Corbett | |
| 3,023,921 A * | 3/1962 | Lustig | B65D 90/08 220/4.12 |
| 5,289,900 A | 3/1994 | Aho, Jr. | |
| 5,622,438 A | 4/1997 | Walsh | |
| 9,856,746 B2 | 1/2018 | Grogg | |
| 10,526,915 B2 | 1/2020 | Suciu | |
| 10,641,128 B2 | 5/2020 | Snape | |
| 10,816,007 B2 * | 10/2020 | Desjardins | F04D 29/644 |
| 11,300,053 B2 | 4/2022 | Hoover | |
| 11,732,654 B2 | 8/2023 | Verma | |
| 12,473,841 B2 | 11/2025 | Fish | |
| 2015/0176492 A1 | 6/2015 | Cutrara | |
| 2015/0315933 A1 | 11/2015 | Do | |

(Continued)

FOREIGN PATENT DOCUMENTS

| | | |
|---|---|---|
| CN | 215761826 U | 2/2022 |
| CN | 117489647 B | 5/2024 |

OTHER PUBLICATIONS

EP Search Report for EP Patent Application No. 25204777.4 dated Feb. 16, 2026.

*Primary Examiner* — Victoria P Augustine
*Assistant Examiner* — Mark K Buse
(74) *Attorney, Agent, or Firm* — Getz Balich LLC

(57) ABSTRACT

An engine oil system includes an oil tank and an access port cover. The oil tank includes a wall forming an internal oil cavity. The wall forms an access port extending along an access port axis through the wall. The access port cover is mounted on the wall and seals the access port. The access port cover includes a cover body and a packing ring. The cover body extends between and to an inner axial end and an outer axial end. The cover body forms a cover lip at the outer axial end. The cover lip extends circumferentially about the access port axis. The cover lip extends radially outward and axially outward, relative to the access port axis, along a lip axis to the outer axial end. The packing ring forms a fluid seal between the cover body and the wall within the access port.

19 Claims, 5 Drawing Sheets

(56) References Cited

U.S. PATENT DOCUMENTS

| 2016/0024964 | A1 |  | 1/2016 | Weiner |  |
|---|---|---|---|---|---|
| 2016/0369749 | A1 | * | 12/2016 | Milton | .................. F02M 37/30 |
| 2017/0267411 | A1 | * | 9/2017 | Beier | .................. G02B 27/025 |
| 2023/0313739 | A1 | * | 10/2023 | Becoulet | .................. F02C 7/32 |
|  |  |  |  |  | 184/6.11 |

* cited by examiner

OIL TANK ACCESS PORT COVER FOR AN AIRCRAFT ENGINE OIL SYSTEM

TECHNICAL FIELD

This disclosure relates to engine oil systems for aircraft engines.

BACKGROUND OF THE ART

Engines for aircraft may typically include rotational equipment configured for facilitating aircraft propulsion, generating electrical power, and/or other functions of aircraft operation. In many cases, rotational equipment may require lubrication and/or cooling, for example, using one or more oil systems to distribute oil to the rotational equipment and/or other oil loads. Various engine oil systems are known in the art. While these known systems may be useful for their intended purposes, there is always room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an engine oil system for an aircraft engine includes an oil tank and an access port cover. The oil tank includes a wall extending between and to an interior wall side and an exterior wall side. The interior wall side forms an internal oil cavity of the oil tank. The wall forms an access port extending along an access port axis through the wall from the interior wall side to the exterior wall side. The access port cover is mounted on the wall and seals the access port. The access port cover includes a cover body and a packing ring. The cover body extends between and to an inner axial end and an outer axial end. The cover body forms a cover lip at the outer axial end. The cover lip extends circumferentially about the access port axis. The cover lip extends radially outward and axially outward, relative to the access port axis, along a lip axis to the outer axial end. The outer axial end is disposed radially outward of the access port and axially outward of the exterior wall side. The packing ring forms a fluid seal between the cover body and the wall within the access port.

In any of the aspects or embodiments described above and herein, the lip axis may be oriented at an acute lip angle relative to the access port axis.

In any of the aspects or embodiments described above and herein, the acute lip angle may be between 30 degrees and 60 degrees.

In any of the aspects or embodiments described above and herein, the packing ring may be disposed at the inner axial end.

In any of the aspects or embodiments described above and herein, the cover lip may have a length and a thickness, and the length may be between 3 and 8 times the thickness.

In any of the aspects or embodiments described above and herein, the access port cover may form a first flange, the wall may form a second flange extending circumferentially about the access port, and the first flange may be mounted on the second flange.

In any of the aspects or embodiments described above and herein, the first flange may be disposed axially between the cover lip and the packing ring.

In any of the aspects or embodiments described above and herein, the cover body may form an inner ring at the inner axial end, the inner ring may extend circumferentially about the access port axis, and the packing ring may be disposed on the inner ring.

In any of the aspects or embodiments described above and herein, the cover lip may extend along the lip axis from an inner radial end to an outer radial end, and the outer radial end may be disposed at the outer axial end.

In any of the aspects or embodiments described above and herein, the inner radial end may be disposed at the access port.

In any of the aspects or embodiments described above and herein, the outer radial end may be a distal radial position of the cover body.

According to another aspect of the present disclosure, an engine oil system for an aircraft engine includes an oil tank and an access port cover. The oil tank includes a wall extending between and to an interior wall side and an exterior wall side. The interior wall side forms an internal oil cavity of the oil tank. The wall forms an access port extending along an access port axis through the wall from the interior wall side to the exterior wall side. The access port cover is mounted on the wall and seals the access port. The access port cover includes a cover body and a packing ring. The cover body extends along the access port axis between and to an inner axial end and an outer axial end. The cover body forms a cover lip at the outer axial end. The cover lip extends circumferentially about the access port axis. The cover lip extends between and to an inner radial end and an outer radial end along a lip axis. The inner radial end is disposed at the access port. The outer radial end is disposed at the outer axial end. The lip axis is oriented at an acute lip angle relative to the access port axis. The packing ring forms a fluid seal between the cover body and the wall within the access port.

In any of the aspects or embodiments described above and herein, the acute lip angle may be between 30 degrees and 60 degrees.

In any of the aspects or embodiments described above and herein, the packing ring may be disposed at the inner axial end.

In any of the aspects or embodiments described above and herein, the cover lip may be axially spaced from the exterior side at the outer radial end.

According to another aspect of the present disclosure, an engine oil system for an aircraft engine includes an oil tank and an access port cover. The oil tank includes a wall extending between and to an interior wall side and an exterior wall side. The interior wall side forms an internal oil cavity of the oil tank. The wall forms an access port extending along an access port axis through the wall from the interior wall side to the exterior wall side. The wall forms an axially-extending face circumscribing the access port. The access port cover is mounted on the wall and seals the access port. The access port cover includes a cover body and a packing ring. The cover body extends along the access port axis between and to an inner axial end and an outer axial end. The cover body has an exterior cover side extending between and to the inner axial end and the outer axial end. The cover body includes an inner ring, a flange, an outer ring, and a cover lip forming the exterior cover side. The inner ring is disposed at the inner axial end. The flange extends between and to the inner ring and the outer ring. The outer ring is disposed at the axially-extending face. The cover lip extends axially between and to the outer ring and the outer axial end. The cover lip is disposed axially outside of the access port. The outer axial end is disposed radially outward of the access port. The packing ring is disposed on the inner ring and forms a fluid seal between the cover body and the wall within the access port.

In any of the aspects or embodiments described above and herein, the cover lip may extend along a lip axis from the access port to the outer axial end, and the lip axis may be oriented at an acute angle relative to the access port axis.

In any of the aspects or embodiments described above and herein, the acute lip angle may be between 30 degrees and 60 degrees.

In any of the aspects or embodiments described above and herein, the outer axial end may be a distal radial position of the cover body.

In any of the aspects or embodiments described above and herein, the cover lip may have a length and a thickness, and the length may be between 3 and 8 times the thickness.

The present disclosure, and all its aspects, embodiments and advantages associated therewith will become more readily apparent in view of the detailed description provided below, including the accompanying drawings.

DETAILED DESCRIPTION

Figure 1:
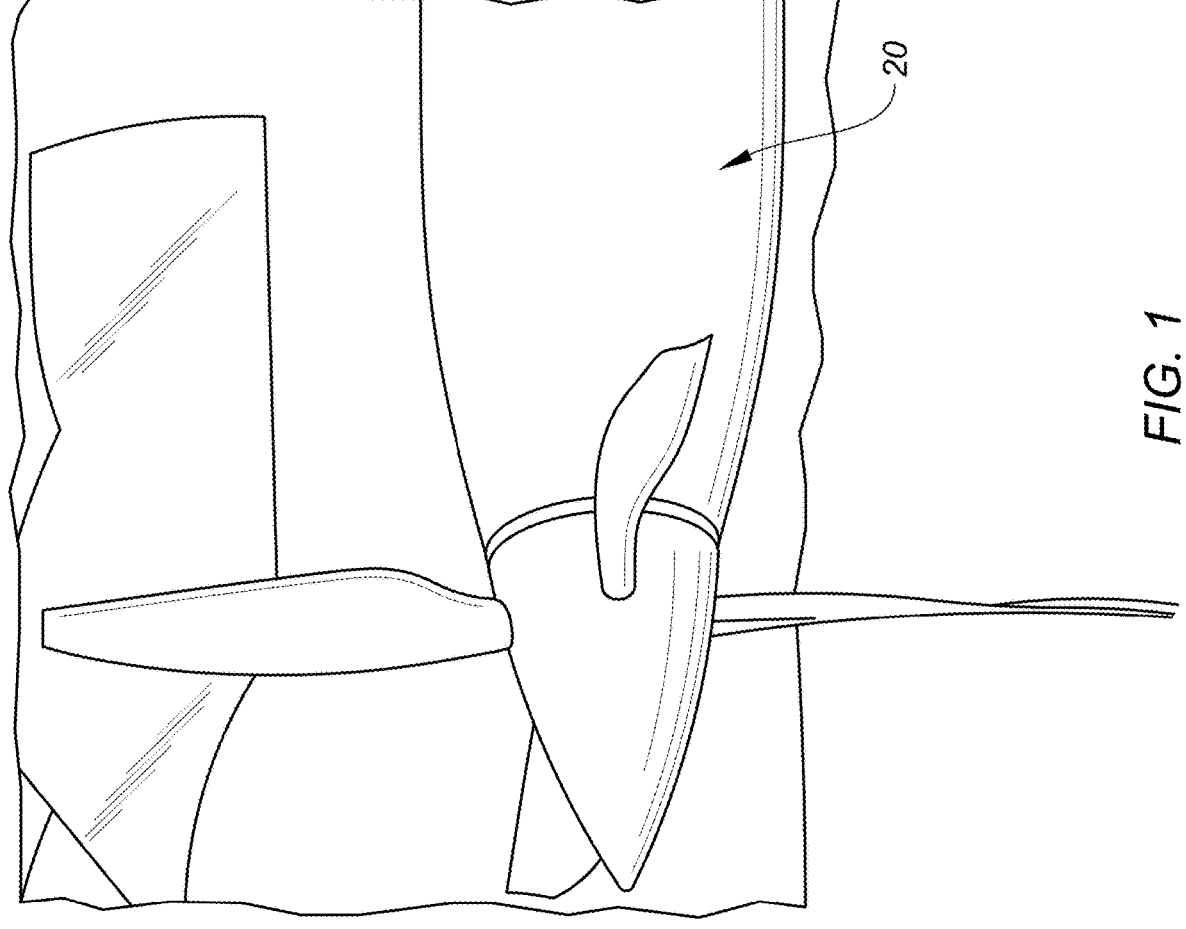
FIG. 1 illustrates a perspective view of an aircraft including a propulsion system, in accordance with one or more embodiments of the present disclosure.

FIG. 1 illustrates a propulsion system 20 for an aircraft. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone).

Figure 2:
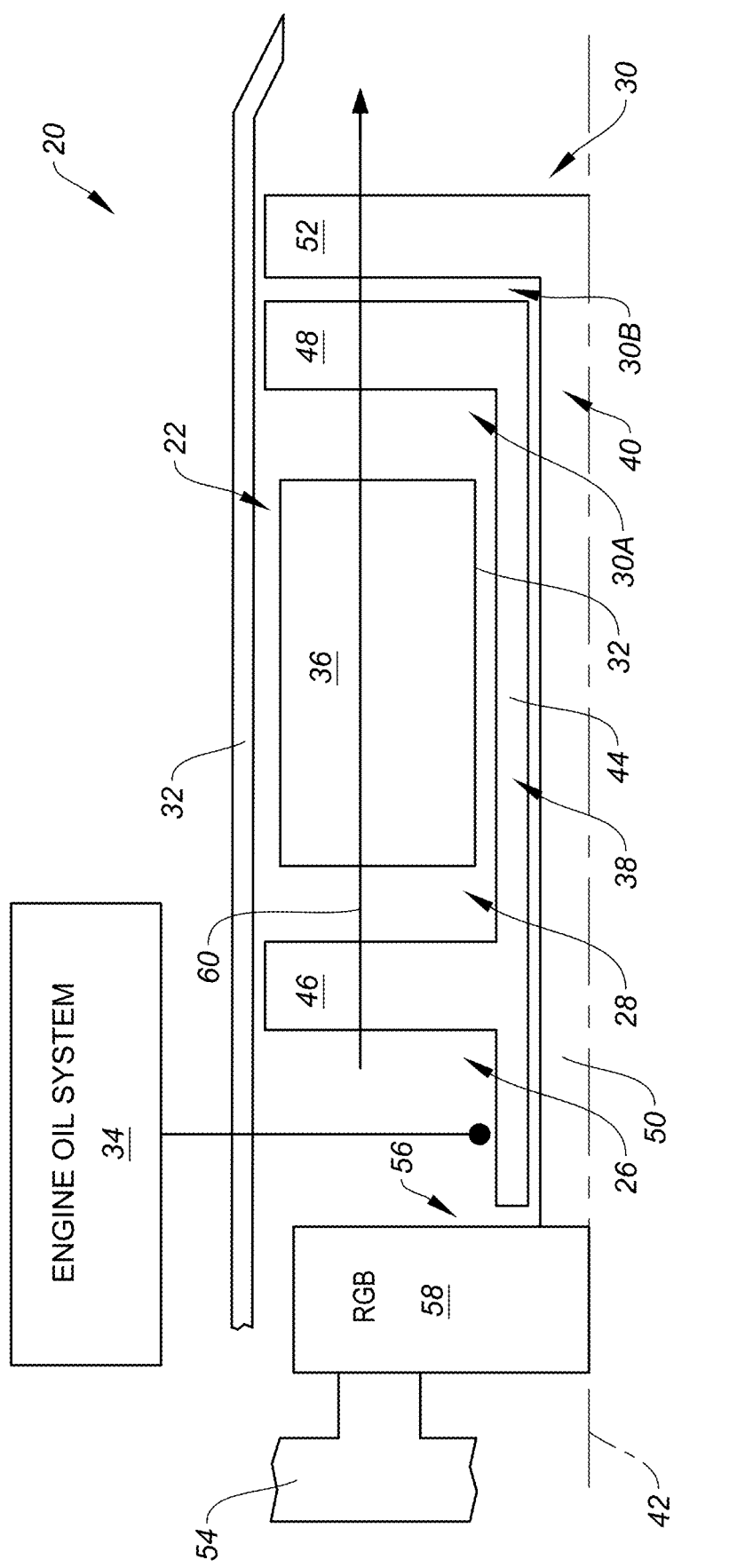
FIG. 2 schematically illustrates a cutaway, side view of an aircraft propulsion system including a gas turbine engine, in accordance with one or more embodiments of the present disclosure.

FIG. 2 schematically illustrates a cutaway, side view of the propulsion system 20. The propulsion system 20 of FIG. 2 includes a gas turbine engine 22. The gas turbine engine 22 of FIG. 2 is configured as a turboprop gas turbine engine. However, while the following description and accompanying drawings may refer to the turboprop gas turbine engine 22 of FIG. 2 as an example, it should be understood that aspects of the present disclosure may be equally applicable to other types of gas turbine engines including, but not limited to, a turboshaft gas turbine engine, a turbofan gas turbine engine, a turbojet gas turbine engine, a propfan gas turbine engine, or an open rotor gas turbine engine. Aspects of the present disclosure may be equally applicable to aircraft propulsion systems including other engine configurations such as, but not limited to, rotary engines, piston engines, and the like, or to electric aircraft propulsion systems (e.g., battery-electric propulsion systems, fuel-cell-electric propulsion systems, etc.). Aspects of the present disclosure may also be equally applicable to aircraft engines which are not part of a propulsion system, for example, an engine for an auxiliary power unit (APU).

The gas turbine engine 22 of FIG. 2 includes a compressor section 26, a combustor section 28, a turbine section 30, an engine static structure 32, and an engine oil system 34. The combustor section 28 includes a combustor 36 (e.g., an annular combustor). The turbine section 30 of FIG. 2 includes a high-pressure turbine (HPT) section 30A and a low-pressure turbine (LPT) section 30B.

Components of the compressor section 26 and/or the turbine section 30 form a first rotational assembly 38 (e.g., a high-pressure spool) and a second rotational assembly 40 of the gas turbine engine 22. The first rotational assembly 38 and the second rotational assembly 40 are mounted for rotation about a rotational axis 42 (e.g., an axial centerline) of the gas turbine engine 22 relative to the engine static structure 32.

The first rotational assembly 38 includes a first shaft 44, a bladed compressor rotor 46 for the compressor section 26, and a bladed first turbine rotor 48 for the high-pressure turbine section 30A. The first shaft 44 interconnects the bladed first compressor rotor 46 and the bladed first turbine rotor 48.

The second rotational assembly 40 includes a second shaft 50 and a bladed second turbine rotor 52 (e.g., a power turbine rotor) for the low-pressure turbine section 30B. The second shaft 50 is connected to the bladed second turbine rotor 52. The second shaft 50 couples the bladed second turbine rotor 52 with a propulsor 54 (e.g., a propeller) of the propulsion system 20. The second shaft 50 of FIG. 2 is coupled to the propulsor 54 by a gear train 56. For example, the gear train 56 of FIG. 2 includes a reduction gear box (RGB) 58 including a gear assembly (e.g., an epicyclic gear assembly) configured to drive the propulsor 54 at a reduced rotational speed relative to the second shaft 50. Alternatively, the second shaft 50 may be directed coupled to the propulsor 54 to drive the propulsor 54 at a same rotational speed as the second shaft 50.

The engine static structure 32 includes one or more engine cases, cowlings, inner fixed structures, and/or other non-rotating structures configured to house and/or support components of the gas turbine engine sections 26, 28, 30. The engine static structure 32 further includes one or more bearing assemblies configured to rotationally support components of the first rotational assembly 38 and the second rotational assembly 40.

In operation of the gas turbine engine 22, ambient air is directed into (e.g., from an air intake) and through the compressor section 26 along a core flow path 60. Air flow along the core flow path 60 is compressed in the compressor section 26, mixed and burned with fuel in the combustor 36, and the resultant combustion gas is directed through the high-pressure turbine section 30A and the low-pressure turbine section 30B. The bladed first turbine rotor 48 and the bladed second turbine rotor 52 rotationally drive the first rotational assembly 38 and the second rotational assembly 40, respectively, in response to the combustion gas flow through the high-pressure turbine section 30A and the low-pressure turbine section 30B. The second rotational assembly 40 drives rotation of the propulsor 54 to generate thrust for the propulsion system 20.

Figure 3:
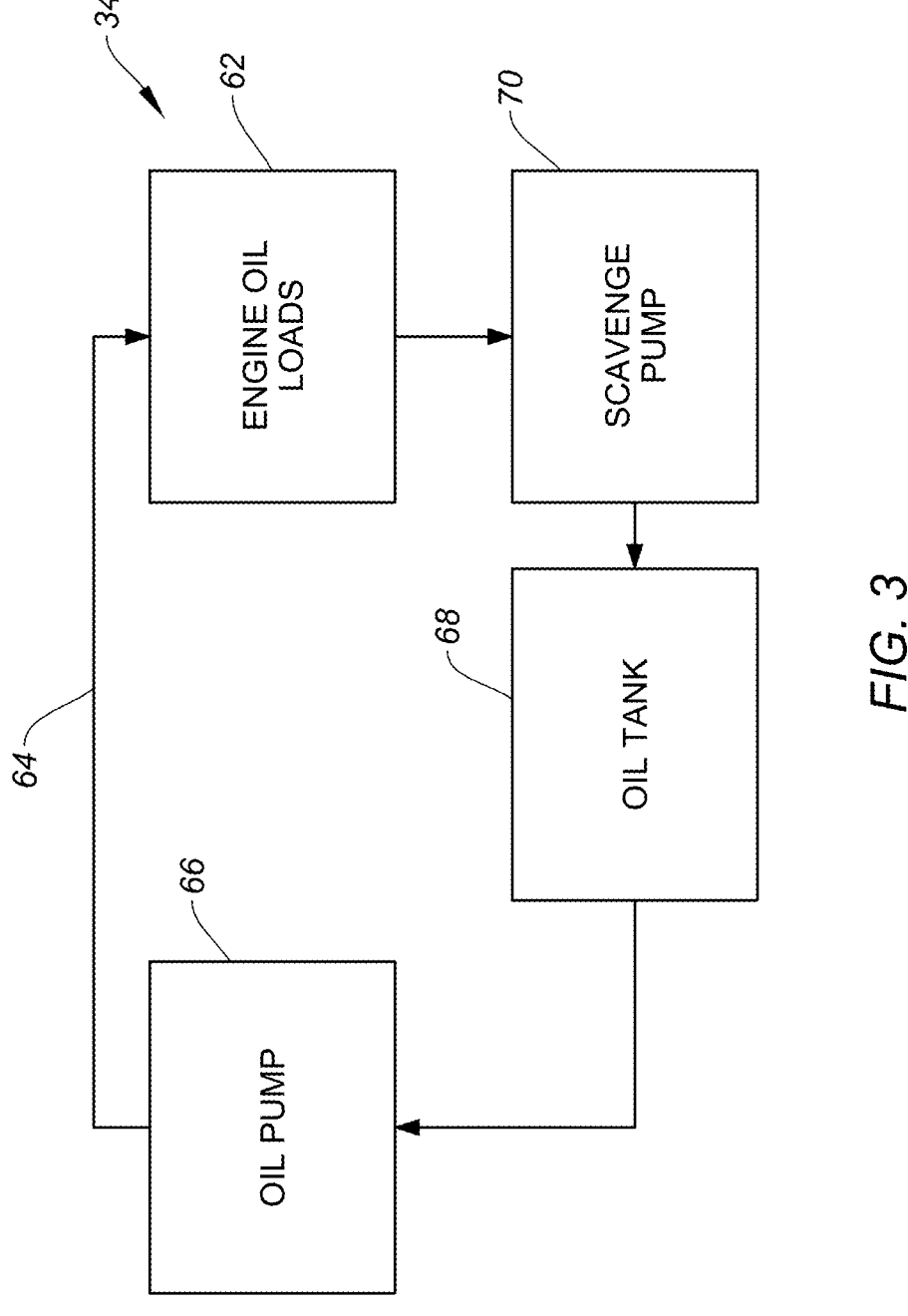
FIG. 3 schematically illustrates an engine oil system for an aircraft propulsion system, in accordance with one or more embodiments of the present disclosure.

Referring to FIG. 3, the engine oil system 34 is configured to facilitate lubrication and/or cooling for components of the propulsion system 20 and its gas turbine engine 22. FIG. 3 schematically illustrates the engine oil system 34. The present disclosure is not limited to the foregoing exemplary configuration of the engine oil system 34 of FIG. 3, and the engine oil system 34 may include additional and/or alternative oil system components (e.g., tanks, valves, heat exchangers, pumps, conduits, regulators, etc.) suitable for facilitating lubrication and/or cooling for components of the propulsion system 20 and its gas turbine engine 22, referred to herein as engine oil loads 62. The engine oil loads 62 may include, but are not limited to, bearing assemblies, gear train 56 components (e.g., the reduction gear box 58), shafts (e.g., the first shaft 44 and the second shaft 50), and the like.

The engine oil system 34 includes an oil flow path 64, an oil pump 66, and an oil tank 68. The engine oil system 34 may additionally include one or more scavenge pumps 70. The oil pump 66 is configured to circulate oil from the oil tank 68 along the oil flow path 64 to direct (e.g., pump) the oil to the engine oil loads 62 for lubrication and/or cooling of the engine oil loads 62. Oil from the engine oil loads 62 is directed to return to the oil tank 68. For example, the scavenge pump 70 may operate to direct (e.g., pump) oil from one or more of the engine oil loads 62, or an oil sump downstream of the engine oil loads 62, to the oil tank 68.

Figure 4:
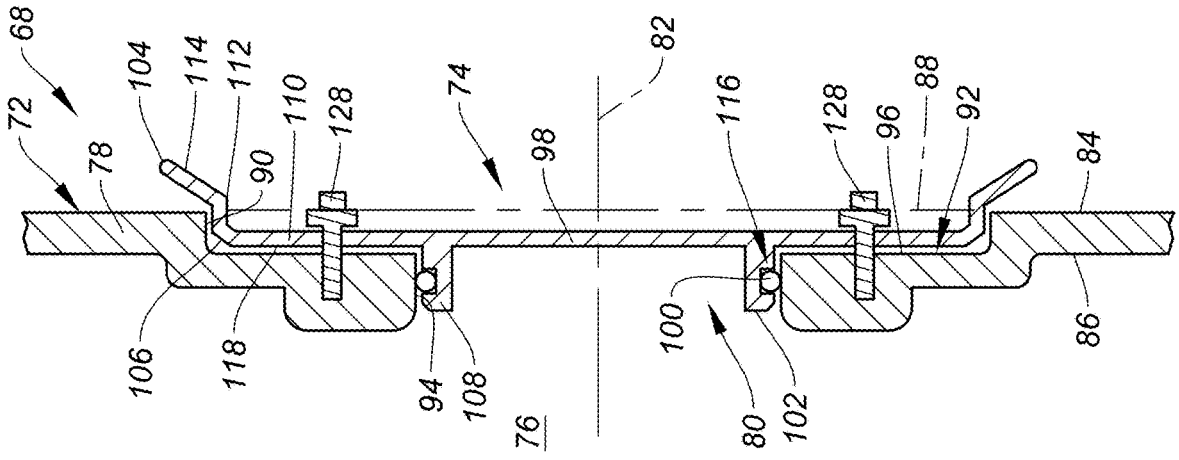
FIG. 4 schematically illustrates a side view of an oil tank and an access port cover for the oil tank, in accordance with one or more embodiments of the present disclosure.

FIG. 4 schematically illustrates a cutaway, side view of a portion of the oil tank 68. The oil tank 68 includes a tank body 72 and an access cover 74. The tank body 72 is a fixed structure of the engine oil system 34 surrounding and forming an internal oil cavity 76 of the oil tank 68, within which internal oil cavity 76 oil may be stored for use by the engine oil system 34. The portion of the tank body 72 illustrated in FIG. 4 forms a sidewall 78 of the oil tank 68. The sidewall 78 may extend, for example, between and to a vertical top and a vertical bottom of the oil tank 68. The sidewall 78 of FIG. 4 forms an access port 80 of the oil tank 68 extending through the sidewall 78 to the internal oil cavity 76. Of course, the access port 80 may alternatively be formed through another portion of the tank body 72 such as, for example, a top wall of the tank body 72. The tank body 72 may additionally form more than one access port (e.g., the access port 80).

The access port 80 is formed by and extends through the sidewall 78 along an axis 82 (e.g., a centerline axis of the access port 80) from an exterior side 84 of the sidewall 78 to an interior side 86 of the sidewall 78. The interior side 86 forms the internal oil cavity 76. The access port 80 may be characterized by an access port plane 88 at the exterior side 84. The access port plane 88 may be orthogonal or substantially orthogonal to the axis 82. The sidewall 78 may form a flange 92 and a sealing surface 94 at (e.g., on, adjacent, or proximate) the access port 80. The flange 92 may extend circumferentially about (e.g., completely around) the axis 82. The flange 92 may be disposed axially between the exterior side 84 and the sealing surface 94. The flange 92 may form a face surface 96 for the access cover 74 which extends orthogonal or substantially orthogonal to the axis 82. The face surface 96 may be axially recessed from the exterior side 84. The face surface 96 may extend (e.g., radially extend) between and to the sealing surface 94 and an axially-extending face 90 formed by the side wall 78. The sealing surface 94 and the axially-extending face 90 may extend circumferentially about (e.g., completely around) the axis 82. The sealing surface 94 may extend between and to the flange 92 (e.g., the face surface 96) and the interior side 86.

Figure 5:
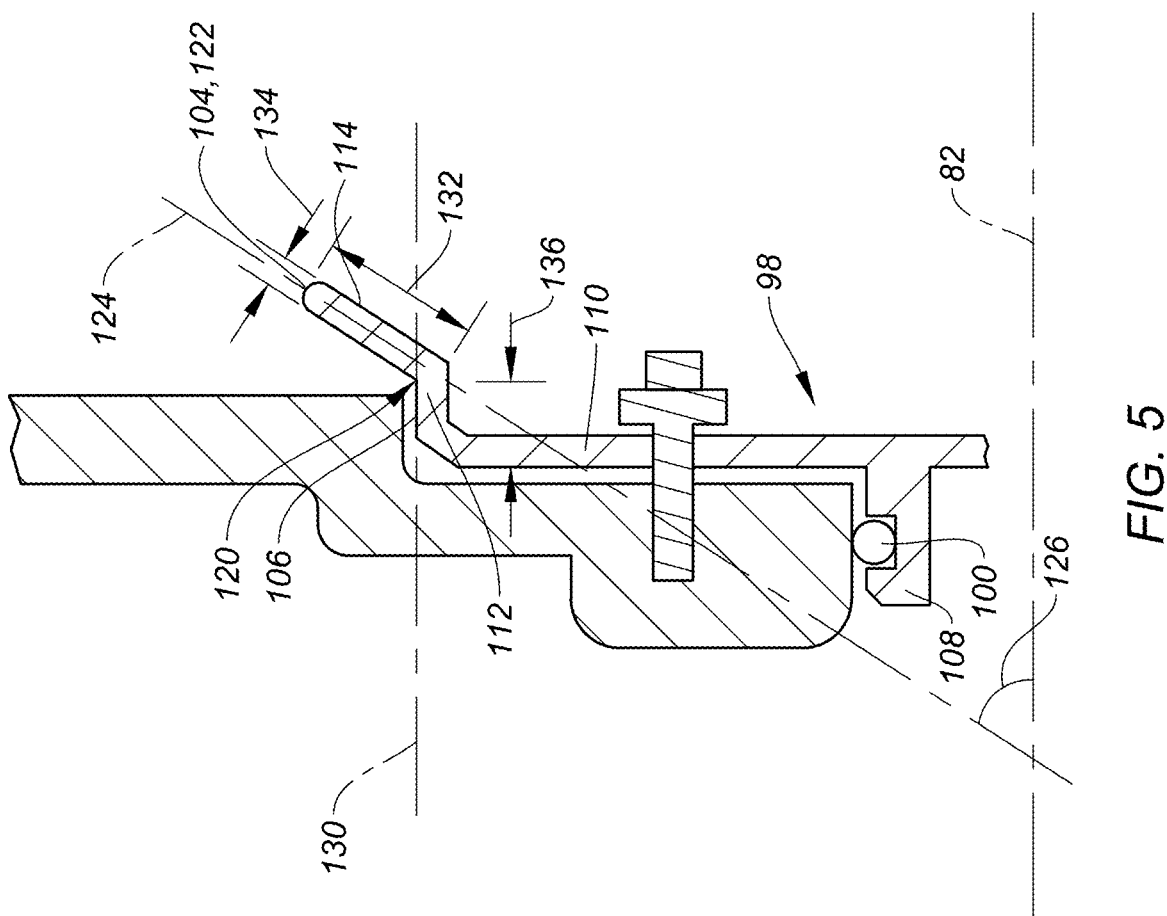
FIG. 5 schematically illustrates a portion of the access port cover of FIG. 4, in accordance with one or more embodiments of the present disclosure.

Referring to FIGS. 4 and 5, the access cover 74 is selectively attachable on the sidewall 78 to open or close the access port 80. The access cover 74 includes a cover body 98 and a packing ring 100. The cover body 98 extends (e.g., axially extends) along the axis 82 between and to an inner axial end 102 of the cover body 98 and an outer axial end 104 of the cover body 98. The cover body 98 has an exterior side 106 (e.g., a radially exterior side) extending between and to the inner axial end 102 and the outer axial end 104. The exterior side 106 extends circumferentially about (e.g., completely around) the axis 82 circumscribing the cover body 98. The cover body 98 includes a plurality of body portions forming the exterior side 106 including an inner ring 108, a flange 110, an outer ring 112, and a cover lip 114. The inner ring 108 extends circumferentially about (e.g., completely around) the axis 82. The inner ring 108 extends between and to the inner axial end 102 and the flange 110. The inner ring 108 forms an annular packing groove 116 for the packing ring 100 along the exterior side 106 The flange 110 extends circumferentially about (e.g., completely around) the axis 82. The flange 110 forms a face surface 118 which extends orthogonal or substantially orthogonal to the axis 82. The face surface 118 may extend (e.g., radially extend) between and to the inner ring 108 and the outer ring 112. The outer ring 112 extends circumferentially about (e.g., completely around) the axis 82. The portion of the exterior side 106 formed by the outer ring 112 may be oriented generally axially between the flange 110 and the cover lip 114, for example, at a surface orientation 130. The surface orientation 130 may be substantially parallel to the axis 82. For example, the surface orientation 130 may be oriented at an angle between about 30 degrees (e.g., flared outward) and about −10 degrees (e.g., flared inward) relative to the axis 82.

The cover lip 114 extends circumferentially about (e.g., completely around) the axis 82. The cover lip 114 is disposed on the outer axial end 104. The cover lip extends between and to an inner radial end 120 of the cover lip 114 and an outer radial end 122 of the cover lip 114. The inner radial end 120 may be disposed at (e.g., on, adjacent, or proximate) the outer ring 112. The inner radial end 120 may additionally or alternatively be disposed at (e.g., on, adjacent, or proximate) the access port plane 88 (e.g., axially coincident with the exterior side 84). For example, the cover lip 114 may form a V-shape interface with the outer ring 112 at (e.g., on, adjacent, or proximate) the inner radial end 120. The outer radial end 122 is disposed on the outer axial end 104. The outer radial end 122 is a distal radial position of the cover body 98. The cover lip 114 extends along a lip axis 124 from the inner radial end 120 to the outer radial end 122. The cover lip 114 extends axially outward (e.g., axially outward from the sidewall 78 and the packing ring 100), along the lip axis 124, from the inner radial end 120 to the outer radial end 122. The lip axis 124 is oriented at a lip angle 126 (e.g., an acute angle) relative to the axis 82. For example, the lip angle 126 may have a value between about 10 degrees and about 80 degrees, or more particularly between about 30 degrees and about 60 degrees. The lip angle 126 may additionally be oriented at an angle (e.g., an acute angle) relative to the exterior surface of the sidewall 78 on the exterior side 84 as shown, for example, in FIG. 5.

Referring to FIG. 5, the cover lip 114 has a length 132 extending along the lip axis 124 between and to the inner radial end 120 to the outer radial end 122. The cover lip 114 has a thickness 134 (e.g., orthogonal to the length 132). The cover body 98 additionally has an axially-extending length 136 extending between and to the face surface 118 and the inner radial end 120.

The packing ring 100 extends circumferentially about (e.g., completely around) the axis 82. The packing ring 100 is disposed within the packing groove 116 formed by the sealing arm 108. Of course, the packing ring 100 may alternatively be disposed within a packing groove formed by the sidewall 78 (e.g., at the sealing surface 94).

FIG. 4 schematically illustrates the access cover 74 attached on the sidewall 78 so as to close the access port 80, thereby sealing the internal oil cavity 76 at the access port 80. The access cover 74 may be installed into the access port 80, for example, by pushing and/or flexing the access cover 74 to direct the inner ring 108 through the access port 80 and engage the packing ring 100 with the sealing surface 94. With the access cover 74 attached to the sidewall 78 and installed into the access port 80, the packing ring 100 is positioned by the inner ring 108 in contact with the sealing surface 94, thereby forming a fluid seal between the sidewall 78 and the access cover 74. The flange 92 (e.g., the face surface 96) is positioned in contact with the flange 110 (e.g., the face surface 118). For example, the flange 110 may be mounted on the flange 92 by a plurality of threaded mechanical fasteners 128 extending through the flange 92 and the flange 110. The outer ring 112 may be disposed at (e.g., on, adjacent, or proximate) the axially-extending face 90. The cover lip 114 projects radially and axially outward from the access port 80 along the lip axis 124. In this installed condition, the outer radial end 122 is disposed radially outward and spaced from the access port 80 and axially outward and spaced from the sidewall 78 and the access port plane 88.

During operation of the gas turbine engine 22 and its engine oil system 34, the oil tank 68 may be exposed to high-temperatures conditions from the operation of the gas turbine engine 22. These high-temperature conditions may contribute to an increased risk of fire in proximity to the oil tank 68. Certification of aircraft propulsion systems may typically require that some propulsion system components, such as the oil tank 68, be capable of continued operation or to otherwise maintain their structural integrity when exposed to a fire, at least for a minimum period of time. An access port cover for an oil tank may be designed for improved fireproofing by, for example, substantially increasing a size and/or thickness of the access port cover. However, this approach to fireproofing may contribute to a substantial weight and/or complexity increase of the propulsion system. In contrast, the cover lip 114 of the present disclosure access cover 74 shields the interface between the access cover 74 and the sidewall 78 at the access port 80 and obstructs movement of a fire traveling along an exterior of the sidewall 78 and the access cover 74. Accordingly, the present disclosure access cover 74 facilitates a reduced likelihood of a failure of the packing ring 100 if the access cover 74 is exposed to a fire, thereby improving the structural and operational integrity of the oil tank 68 during fire conditions while also allowing the access cover 74 to have a reduced weight and/or thickness compared to conventional alternatives. To facilitate sufficient fire obstruction, heat resistance, and/or structural rigidity of the cover lip 114, the length 132 may be between about 3 and 8 times the thickness 134 and/or the length 132 may be between about 0.5 and 5 times the length 136.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An engine oil system for an aircraft engine, the engine oil system comprising:

an oil tank including a wall extending between and to an interior wall side and an exterior wall side, the interior wall side forming an internal oil cavity of the oil tank, the wall forming an access port extending along an access port axis through the wall from the interior wall side to the exterior wall side; and an access port cover mounted on the wall and sealing the access port, the access port cover including a cover body and a packing ring, the cover body extending between and to an inner axial end and an outer axial end, the cover body forming a cover lip at the outer axial end, the cover lip extending circumferentially about the access port axis, the cover lip extending radially outward and axially outward, relative to the access port axis, along a lip axis to the outer axial end, the outer axial end disposed radially outward of the access port and axially outward of the exterior wall side, the packing ring forming a fluid seal between the cover body and the wall within the access port;

wherein the access port cover forms a first flange, the wall forms a second flange extending circumferentially about the access port, and the first flange is mounted on the second flange.

2. The engine oil system of claim 1, wherein the lip axis is oriented at an acute lip angle relative to the access port axis.

3. The engine oil system of claim 2, wherein the acute lip angle is between 30 degrees and 60 degrees.

4. The engine oil system of claim 1, wherein the packing ring is disposed at the inner axial end.

5. The engine oil system of claim 1, wherein the cover lip has a length and a thickness, and the length is between 3 and 8 times the thickness.

6. The engine oil system of claim 1, wherein the first flange is disposed axially between the cover lip and the packing ring.

7. The engine oil system of claim 1, wherein the cover body forms a inner ring at the inner axial end, the inner ring extends circumferentially about the access port axis, and the packing ring is disposed on the inner ring.

8. The engine oil system of claim 1, wherein the cover lip extends along the lip axis from an inner radial end to an outer radial end, and the outer radial end is disposed at the outer axial end.

9. The engine oil system of claim 8, wherein the inner radial end is disposed at the access port.

10. The engine oil system of claim 8, wherein the outer radial end is a distal radial position of the cover body.

11. An engine oil system for an aircraft engine, the engine oil system comprising:

an oil tank including a wall extending between and to an interior wall side and an exterior wall side, the interior wall side forming an internal oil cavity of the oil tank, the wall forming an access port extending along an access port axis through the wall from the interior wall side to the exterior wall side; and an access port cover mounted on the wall and sealing the access port, the access port cover including a cover body and a packing ring, the cover body extending along the access port axis between and to an inner axial end and an outer axial end, the cover body forming a cover lip at the outer axial end, the cover lip extending circumferentially about the access port axis, the cover lip extending between and to an inner radial end and an outer radial end along a lip axis, the inner radial end disposed at the access port, the outer radial end disposed at the outer axial end, the lip axis oriented at an acute lip angle relative to the access port axis, the packing ring forming a fluid seal between the cover body and the wall within the access port.

12. The engine oil system of claim 11, wherein the acute lip angle is between 30 degrees and 60 degrees.

13. The engine oil system of claim 11, wherein the packing ring is disposed at the inner axial end.

14. The engine oil system of claim 11, wherein the cover lip is axially spaced from the exterior side at the outer radial end.

15. An engine oil system for an aircraft engine, the engine oil system comprising:

an oil tank including a wall extending between and to an interior wall side and an exterior wall side, the interior wall side forming an internal oil cavity of the oil tank, the wall forming an access port extending along an access port axis through the wall from the interior wall side to the exterior wall side, the wall forming an axially-extending face circumscribing the access port; and an access port cover mounted on the wall and sealing the access port, the access port cover including a cover body and a packing ring, the cover body extending along the access port axis between and to an inner axial end and an outer axial end, the cover body having an exterior cover side extending between and to the inner axial end and the outer axial end, the cover body including an inner ring, a flange, an outer ring, and a cover lip forming the exterior cover side, the inner ring disposed at the inner axial end, the flange extending between and to the inner ring and the outer ring, the outer ring disposed at the axially-extending face, the cover lip extending axially between and to the outer ring and the outer axial end, the cover lip disposed axially outside of the access port, the outer axial end disposed radially outward of the access port, the packing ring disposed on the inner ring and forming a fluid seal between the cover body and the wall within the access port.

16. The engine oil system of claim 15, wherein the cover lip extends along a lip axis from the access port to the outer axial end, and the lip axis is oriented at an acute angle relative to the access port axis.

17. The engine oil system of claim 16, wherein the acute lip angle is between 30 degrees and 60 degrees.

18. The engine oil system of claim 15, wherein the outer axial end is a distal radial position of the cover body.

19. The engine oil system of claim 15, wherein the cover lip has a length and a thickness, and the length is between 3 and 8 times the thickness.

\* \* \* \* \*